Figure 4:
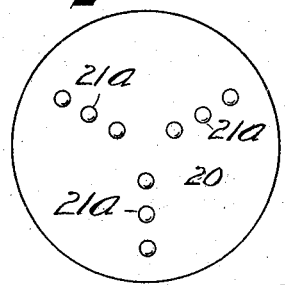

No. 769,193. PATENTED SEPT. 6, 1904.
C. F. SMITH.
BREAD MIXER AND KNEADER.
APPLICATION FILED JAN. 2, 1904.
NO MODEL. 2 SHEETS—SHEET 1.
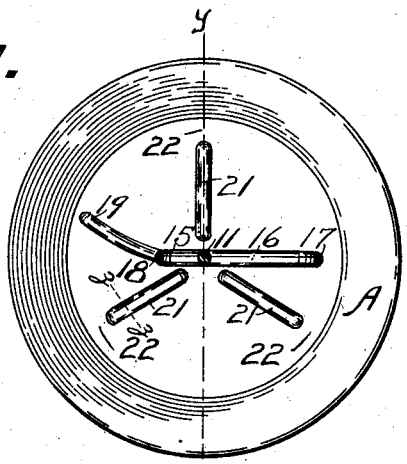
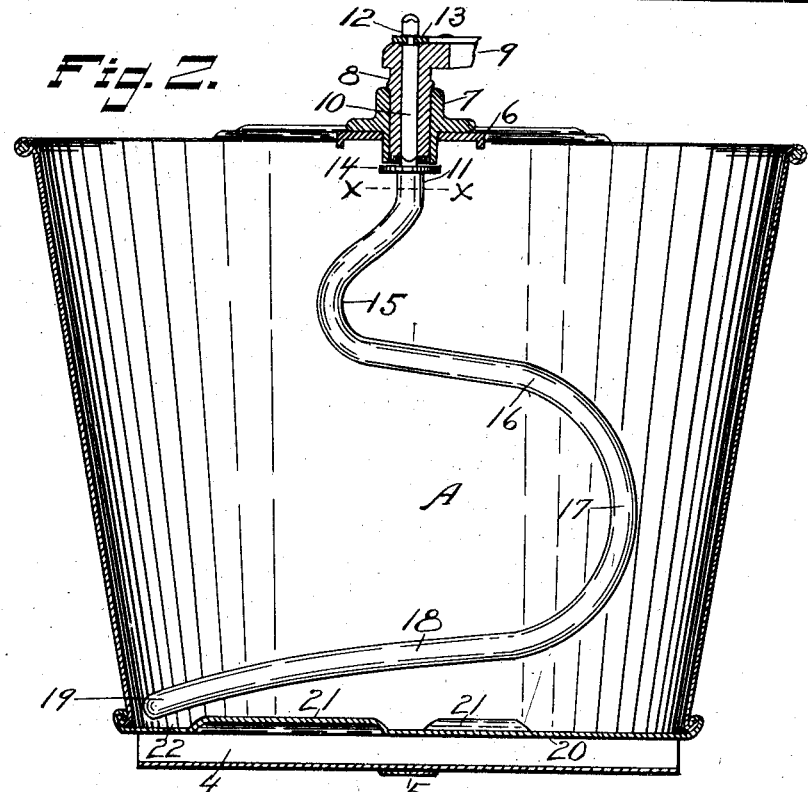

No. 769,193. PATENTED SEPT. 6, 1904.
C. F. SMITH.
BREAD MIXER AND KNEADER.
APPLICATION FILED JAN. 2, 1904.

NO MODEL. 2 SHEETS—SHEET 2.

Witnesses
H. S. Woods.
T. S. Hall.

Inventor
Charles F. Smith
By James Shepard.
Atty

No. 769,193.

Patented September 6, 1904.

UNITED STATES PATENT OFFICE.

CHARLES F. SMITH, OF NEW BRITAIN, CONNECTICUT, ASSIGNOR TO LANDERS, FRARY AND CLARK, OF NEW BRITAIN, CONNECTICUT, A CORPORATION.

BREAD MIXER AND KNEADER.

SPECIFICATION forming part of Letters Patent No. 769,193, dated September 6, 1904.

Application filed January 2, 1904. Serial No. 187,433. (No model.)

*To all whom it may concern:*

Be it known that I, CHARLES F. SMITH, a citizen of the United States, residing at New Britain, in the county of Hartford and State of Connecticut, have invented certain new and useful Improvements in Bread Mixers and Kneaders, of which the following is a specification.

My invention relates to improvements in bread mixers and kneaders; and the object of my improvement is increased efficiency with reference to the kneading operation.

In the accompanying drawings, Figure 1 is a sectional plan view of beater and vessel, the plane of section for the beater being on the line $x$ $x$ of Fig. 2. Fig. 2 is an enlarged vertical section of the machine on the line $y$ $y$ of Fig. 1 with parts broken away. Fig. 3 is an enlarged vertical section of a portion of the vessel on the line $z$ $z$ of Fig. 1. Figs. 4, 5, 6, 7, 8, 9, 10, and 11 are plan views of the bottom of the beater vessel, showing various modifications in the form of the kneading-fingers, the scale being the same as that of Fig. 1.

The machine herein shown is made in accordance with some of the features in each of the following patents: to Stevens, No. 663,795, December 11, 1900, No. 733,763, July 14, 1903, and Reissue No. 12,167, November 3, 1903; to Munson, No. 729,884, June 2, 1903, and to Garrigus and Warner, No. 736,956, August 25, 1903.

A designates the vessel, having underneath its bottom 20 the clamp-receiving socket 4 and feet 5, by means of which socket and a clamp (not shown) the vessel may be firmly secured to a table or support. At the top of the vessel is the detachable cross piece or frame 6, having the bearing 7, within which bearing the hub 8 of the crank 9 is journaled, the said hub being axially perforated with an angular hole to receive the angular shank 10 of the beater shaft or axle 11. The upper end of the said shank is provided with a narrow neck 12 for the engagement of the latch 13, as in the said Garrigus and Warner patent, although, as herein shown, the crank-hub is detachable from the bearing 7, and the shaft 11 has rigidly secured thereon just below the angular shank the flange 14.

As in the said Stevens patents, the beater is composed of a bent rod. At the upper end is the straight vertical axle or shaft 11, below which is the short bend 15, extending laterally but a short distance, and below this short bend is the upper member 16 of the beater proper, which extends laterally toward the side of the vessel A. From the outer end of the said upper member is the connecting member 17, at the lower end of which is the lower member 18 of the beater. This lower member when used with a vessel having a flat bottom, as shown, drops down gradually from the connecting member to near the bottom, the outer end 19 of the said lower member being preferably curved laterally forward, as shown in Fig. 1, and nearly reaching the bottom corner of the vessel. The beater, it should be noticed, revolves upon an axis that is perpendicular to the bottom of the vessel, and the lower member 18, which constitutes the beater proper, consists of a single arm extending laterally across the bottom a little above the said bottom, the said member 18 being connected with axle 11 at a point above the said member, whereby there is no shaft or axle in the plane of the said lower member 18. In connection with this beater one or more kneading-fingers 21—three, as shown—are formed, so as to project from the inner face of the bottom of the vessel and extending inwardly from near the corner or outer portion of the bottom and preferably in a radial direction.

I prefer to make the kneading-fingers so short at their outer ends as to leave a smooth face 22 between the outer end of each finger and the junction of the side of the vessel with the bottom, as shown in Figs. 1 and 2, and to make the point 19 of the beater come closely to the outer corner of the vessel, so as to clean the said corner, and thus leave the vessel cleaner, especially at the corner, when the beater with the mass of dough on it is removed than would be the case if the point of the beater could not thus enter the said corner.

While I prefer to employ the three kneading-fingers shown in Figs. 1 and 2, other forms may be employed in combination with the single-arm beater shown without departing from the spirit and scope of my invention.

Figure 5:
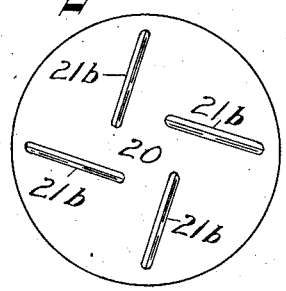
Figure 6:
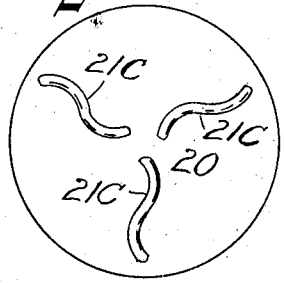
Figure 7:
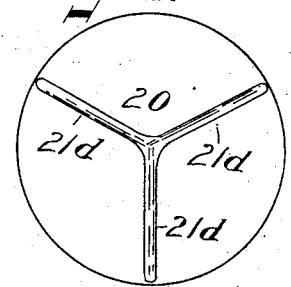
Figure 8:
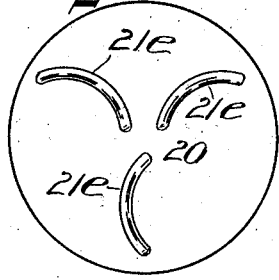
Figure 9:
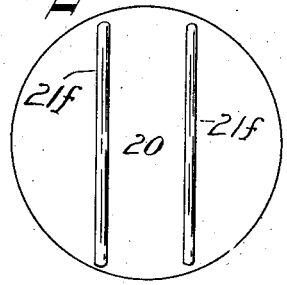
Figure 10:
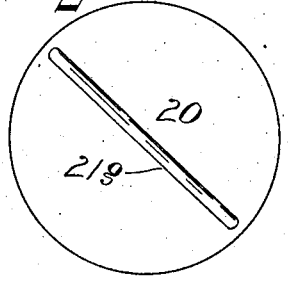
Figure 11:
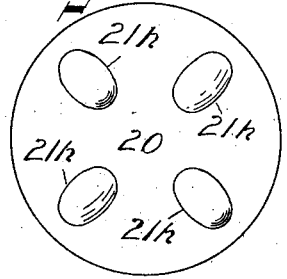

In Fig. 4 there are shown three radial series of projections 21$^a$, which form an equivalent for the three kneading-fingers hereinbefore described. In Fig. 5 there are four kneading-fingers 21$^b$, arranged tangentially instead of radially. In Fig. 6 there are three kneading-fingers 21$^c$, differing from those first described by being curved longitudinally. In Fig. 7 there are three radially-arranged fingers 21$^d$, similar to those shown in Fig. 1, only they come together in the center and extend to the edge of the bottom. In Fig. 8 there are also three kneading-fingers 21$^e$, curved longitudinally, but not differing essentially from the fingers of Figs. 1 and 6. In Fig. 9 there are two kneading-fingers 21$^f$, arranged somewhat tangentially and extending across the bottom, so that each finger acts twice in connection with one revolution of the beater. In Fig. 10 there is a single kneading-finger 21$^g$, extending substantially across the bottom diametrically. In Fig. 11 there are four kneading-fingers 21$^h$; but instead of being long and slender they are made short and thick. They are, however, so disposed as to leave clear spaces between them, so as to have an action similar to that of the other fingers.

In the operation of kneading the mass of dough clings to the bottom of the vessel, while the beater revolves and acts upon the mass in a plane above the bottom and rolls the dough over and over the lower member 18 as the beater revolves. If, however, the dough is too stiff to stick to the bottom of the vessel or if flour is freshly applied to the bottom, the mass may slide over the bottom of the vessel and be carried round and round without any of the rolling action which is essential to the kneading operation. By my improvement dough that might thus slip over the smooth bottom of a vessel will be caught by the kneading-fingers in any of their several forms at the lower part of the mass, while the lower member of the beater acting on the mass in a higher plane will roll the dough over and over, so as to thoroughly knead it. Even one kneading-finger on the bottom would so act, although I prefer to employ two or three fingers; but it is thought that for the best results there should be an extended smooth surface between the kneading-fingers. No advantage can be seen in the employment of more than three kneading-fingers, and if the kneading-fingers should be so near each other as to have the spaces between them filled with dough that might be separated from the mass the effect would be to make practically a smooth bottom. By so disposing or arranging the kneading-fingers, as herein shown in the several views, as to leave quite an extended smooth surface between the kneading-fingers the dough that enters the space between the said fingers will be taken up and carried around with the mass.

The ribs may be formed in any ordinary manner; but I have shown them as hollow ribs struck up directly from the metal of which the bottom 20 is formed.

I claim as my invention—

1. The combination of a mixing and kneading vessel with kneading-fingers projecting from the inner face of the bottom of the said vessel, and extending from near the outer edge of the bottom toward the center, leaving a smooth face at the bottom corner of the said vessel between the outer ends of the said fingers and outer edge of the bottom, and a beater concentrically mounted to revolve on a vertical axis within the said vessel, the main operative member of the said beater consisting of a single rod-like lower member extending across the axis of the said beater in a higher plane than that of the said kneading-fingers, the outer end of the said rod-like member of the beater extending outwardly beyond the outer ends of the said fingers.

2. The combination of a mixing and kneading vessel with kneading-fingers at the bottom thereof and wide smooth faces in the spaces lying between the said fingers, a beater concentrically mounted on an axis perpendicular to the bottom of the said vessel, the said beater having at its lower end a rod-like member extending laterally across the axis of the said vessel and connected with the axle of the said beater at a point above the said lower member, whereby the mass of dough being kneaded may roll over and over the said lower member as the said beater is moved over the said kneading-fingers.

CHARLES F. SMITH.

Witnesses:
G. M. LANDERS,
J. N. STANLEY.